INVENTORS
George W. Ward
Herbert Wald
William O. Blanch

United States Patent Office 3,565,662
Patented Feb. 23, 1971

3,565,662
STRIP COATING METHOD AND APPARATUS
George W. Ward, Nazareth, Pa., and Herbert Wald and William O. Blanch, Baltimore, Md., assignors to Bethlehem Steel Corporation, a corporation of Delaware
Continuation of application Ser. No. 498,648, Oct. 20, 1965. This application May 21, 1969, Ser. No. 828,431
Int. Cl. B44d 1/095
U.S. Cl. 117—16
9 Claims

ABSTRACT OF THE DISCLOSURE

In a method of coating metal strip with powder, air is introduced into a plenum chamber and forced through a superimposed diffusing plate to fluidize powder in a chamber above said plenum chamber and plate. Brushes, located in the fluidizing chamber, displace part of the fluidized powder to a coating zone directly above the fluidizing chamber. Strip passes through the coating zone wherein the underside of the strip is coated.

CROSS REFERENCE TO RELATED APPLICATION

This application is a continuation of application Ser. No. 498,648, filed October 20, 1965, now abandoned.

This invention relates to the deposition of pulverulent material on a moving workpiece, and is particularly adapted to elongate material such as sheet, strip or flat wire.

In the application of a pulverulent material to the surface of continuous lengths of strip or sheet material by means of a fluid bed, two major problems develop which are difficult to control.

Generally, air pressure is used to maintain the bed of finely divided powder in a fluid condition. A fluid bed of this sort may not always maintain a uniform concentration at the exact point of application of powder to the moving workpiece, due to air currents which build up in the bed.

If the moving workpiece to be coated is moved through the bed in a vertical direction, an opening must be provided in the bottom of the equipment in which the bed is contained to permit passage of the workpiece. Because of the necessarily fine particle size of the fluid bed powder, the powder tends to seep through any such opening, and may, thus, in a relatively short time, empty the fluidizing chamber. Leaking of the powder also creates a dust problem, although considerable dust will also be created at the exit end of a vertical type fluidizing operation. The same problem occurs if the strip is moved through the fluid bed in a horizontal direction, in which case openings must be provided in the side walls of the fluid bed container.

Attempts have been made to seal the openings in the bed container through which the strip passes, but results have not been very successful in containing the fluidized powder. Particularly troublesome in this respect are the very dry abrasive powders of metals and various inorganic materials such as oxides.

Seals must necessarily be of a flexible material which ordinarily will not withstand unusual abrasive conditions. Rubber and felt seals, for example, will deteriorate rapidly when metal strip having rough edges is drawn through them. Frequent replacement of the seals is required, and this involves rethreading of the strip through the fluidizing apparatus.

The various types of seals which have been used on the bed container openings may themselves be objectionable in certain operations. In the coating of metal strip from a fluid bed of relatively dense inorganic or metallic powder, it is customary to film the surface of the strip with an oil, alcohol or other fluid of sufficient tackiness to cause the powder to adhere to the strip base. When the filmed strip passes through a seal, the oil film may be disturbed if powder has collected around the seal.

It is an object of this invention to coat elongate material such as strip in a fluid powder bed, without attendant seal problems.

Another object is to provide apparatus whereby strip can be coated uniformly with powder.

A further object is to provide a means for maintaining a fluid bed of constant height and concentration.

These and other objects are attained by this invention.

To maintain a fluid bed of proper height and concentration, air or other fluidizing gas is introduced into a plenum chamber under pressure, and forced upwardly through a diffusing medium to a superimposed chamber containing a powder bed. Gas, coursing upwardly through the diffusing medium, fluidizes the powder. The fluidizing powder is maintained at a uniform level of even concentration by at least one pair of rolls located in the lower portion of the bed. By adjusting the speed of the rolls, the height of the fluid bed can be projected above the walls of the fluidizing chamber, thus making it possible to pass a continuous strip horizontally in contact with the top portion of the bed above the fluidizing chamber.

In the accompanying drawings:

FIG. 3 is an isometric view of a portion of a brush roll assembly.

A full description of the apparatus, and of the manner by which it can be utilized for coating continuous lengths of strip, will be given in the following example.

Figure 1:
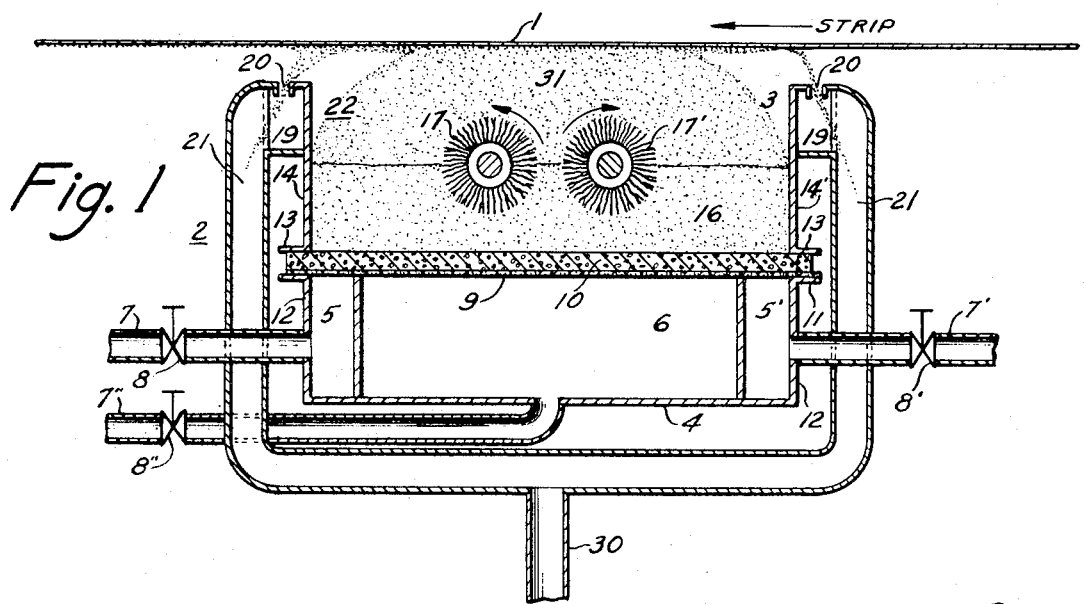
FIG. 1 is an elevational view, in transverse section, of a fluid bed coating apparatus.

Referring to FIG. 1, a steel strip 1 of 0.036 inch gage is filmed with tridecyl alcohol and passed transversely over coating apparatus 2, so that the strip passes in contact with the top portion of fluid bed 3 when it is fluidized as hereinafter described. In the coating apparatus 2, a plenum chamber 4 is divided into three compartments 5, 5' and 6. Air under pressure is introduced into compartment 5 by means of pipe 7 and valve 8, into compartment 5' by means of pipe 7' and valve 8', and into compartment 6 by pipe 7" and valve 8". Operating pressure in compartments 5 and 5' is about 7 inches w.c., and in compartment 6 it is about 1 inch w.c.

From compartments 5 and 5', the air passes through felt 9 of about ¼ inch thickness, and thence into a porous diffusing membrane 10. The diffusing membrane is composed of sintered aluminum oxide, and has a thickness of about ¾ inch. A gasket, not shown, is placed between the bottom periphery of the felt strip 9 and offset portion 11 of the plenum chamber support wall 12. Another gasket, not shown, is placed between the upper periphery of membrane 10 and the offset portions 13 and 13' of support walls 14 and 14'.

Air, still under pressure, courses through the felt and diffusing membrane in all directions, leaving membrane 10 in an upward direction and entering fluidizing chamber 22.

When air enters the fluidizing chamber under a sufficient predetermined pressure, the powder in lower portion 16 of the fluid bed 3 will be maintained in a fluid condition. The air pressure required will be determined by the nature and degree of fineness of the powder to be fluidized. Other factors are the depth of the bed, and the size, number and design of the plenum chamber compartments.

Two 4-inch diameter brush rolls 17 and 17', located in the lower portion of fluidizing chamber 22, are mounted on steel shafts 18 and 18' respectively, and rotate in opposed upward relation. The axes of the shafts are in horizontal relation, the shafts running the length of chamber 22, as will be more fully described. The brush rolls are motor driven, and the speed of rotation is controlled. By adjusting the speed of the brush rolls to accommodate the particular powder in bed 16, a portion of the fluidized powder is displaced upwardly by the revolving brush rolls, the powder forming a fluid body 31 above the brushes and having substantially the configuration of a paraboloid. The fluid body 31 provides a coating zone, and the filmed strip 1 is passed in contact with the portion 31 of the fluid bed 3, at a point several inches below the apex of the arc normally attained by the bed.

By the sequence of steps described in the example a fluid bed of constant height and uniform concentration is formed, and the strip, passing in contact with the top portion of the bed will have its underside uniformly coated with powder particles. The opposite side of the strip can be coated by passing the coated strip around a roll on the uncoated side, and then passing the strip, with uncoated side down, in contact with another fluid bed similar to the one just described. When it is desired to coat both sides of the strip, it is preferable to coat the two sides in sequence, using two fluid beds, one for each side, as this eliminates extra handling, including coiling and uncoiling of the strip prior to any succeeding step, such as compacting, fusing, heat treating, etc., which may be necessary to fix the powder firmly on the strip surface.

The strip itself acts as an effective stop at the top of the bed to prevent powder from escaping from the fluidizing chamber at that point. Fines, which drift to the sides of the chamber, and which might otherwise escape into the atmosphere surrounding the coating operation, are effectively drawn into a suction plenum 19, more clearly shown in FIG. 2, through a narrow entrance 20, and are withdrawn through suction plenum duct 21 and pipe 30 to a dust collector. The fines may be returned to the fluidizing chamber 22.

Figure 2:
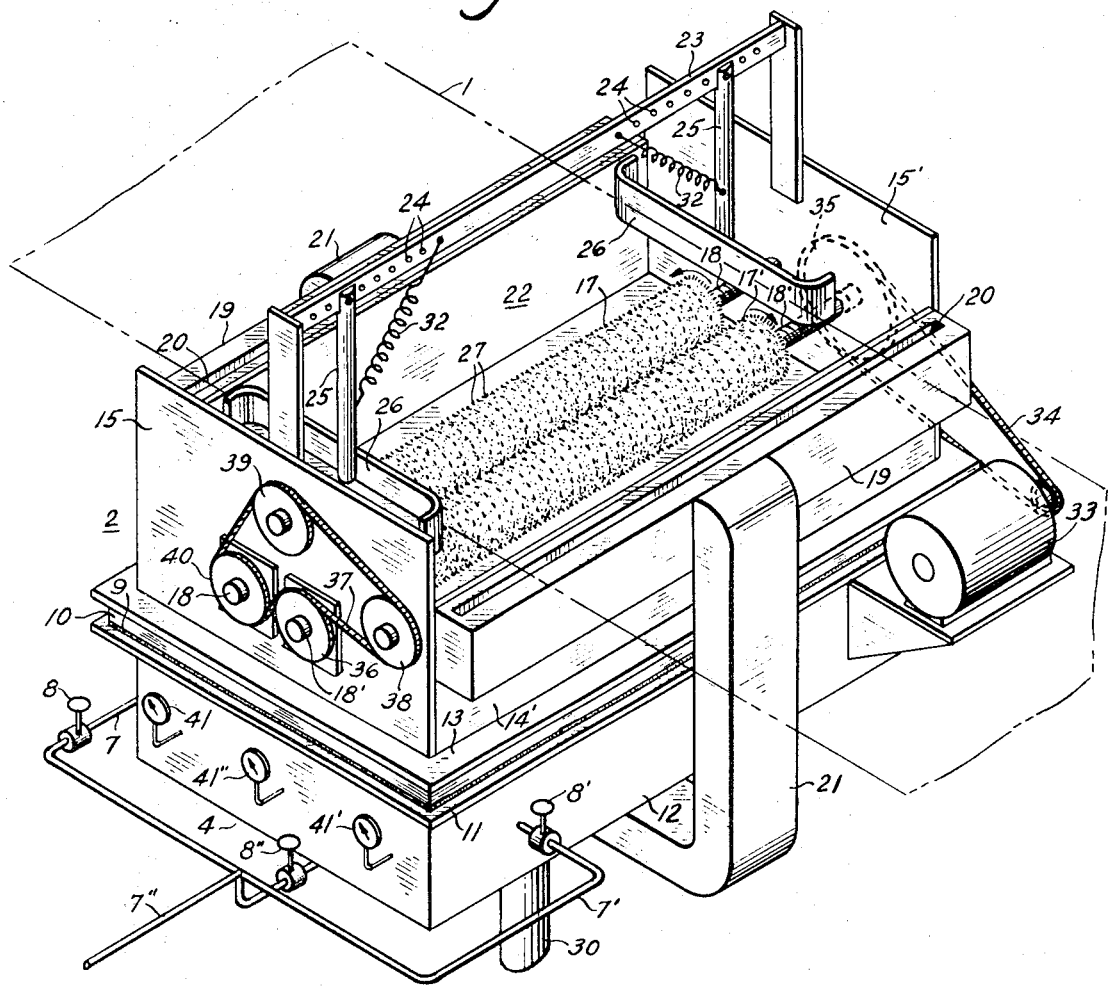
FIG. 2 is an isometric view of the coating apparatus and associated controls.
Figure 4:
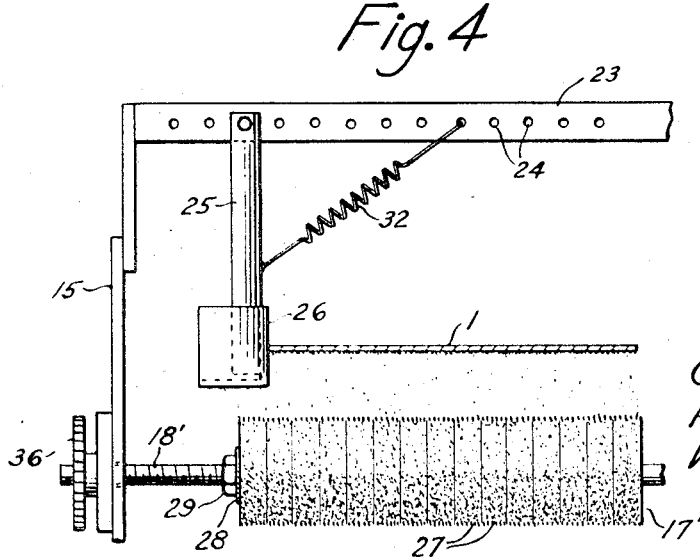
FIG. 4 is a detailed view of powder shielding means.

Referring now to FIG. 2, overhead rack 23 has openings 24 at each end for the support of depending member 25, which is attached to edge shield 26. The openings provide for adjustment in positioning of the edge shield to accommodate various widths of strip. The edge shield— one on each edge of the strip—is held against the strip by spring loading device 32, as shown in FIG. 4, and thus confines the fluid bed so that the bed does not extend any significant distance beyond the edge of the strip. This feature also aids in preventing inadvertent coating of the top strip surface.

When the strip is narrower than the length of the brush rolls, plates, not shown, may be used to cover the exposed parts of the rolls in order to confine any powder which would be thrown up beyond the strip edge.

Referring to FIG. 3, a complete brush roll assembly 17 is attached to shaft 18 and is made up of a series of narrower individual circular brushes 27 about ⅜ inch thick at the hub. For example, in the case of brush roll 17, each individual brush 27 is mounted on shaft 18, and held together forcibly by a washer 28 and retainer nut 29 supplied to each end of the complete brush roll assembly. Retainer nut 29 is screwed onto a threaded portion of shaft 18.

When wire brushes are used, it is not necessary to form the brush by segments of smaller brush rolls, as shown in the example. The complete brush assembly can be made in one piece, with brush wires incorporated in the shaft.

Referring again to FIG. 2, motor 33 supplies the driving power for brush rolls 17 and 17'. Power is transmitted from motor 33 to shaft 18' and brush roll 17' via belt 34 and pulley 35, turning brush roll 17' in a clockwise direction, and at a speed controlled to supply the proper height of fluid powder. At the opposite end of shaft 18', and on the outside of fluidizing chamber support wall 15, there is attached sprocket 36. Sprocket 36 turns drive chain 37, which in turn operates around idler sprockets 38 and 39, and then contacts sprocket 40 which transmits power to shaft 18 and brush roll 17, so that brush roll 17 turns synchronously with, and in counter direction to, brush roll 17'.

Air pressure gages 41, 41' and 41'' are located at positions where they may be read conveniently so that proper control can be maintained over the pressure in the individual plenum chambers.

While the particular design and number of compartments for the air plenum chamber, shown in the foregoing example, has proved quite satisfactory, especially when used in conjunction with relatively dense powder, the number and relative size of the compartments can be varied to promote the most efficient fluidizing for any given powder. For example, instead of one compartment at each end of the fluidizing chamber, and one in the center, to which air is directly introduced, two separate compartments for directly introduced air under pressure may be located at each end of the chamber, with a compartment in the middle somewhat reduced in size over that shown in the example. The primary purpose of any design used for the air plenum chamber is to introduce air into the fluidizing chamber, by way of the diffusing membrane, in a manner which will reduce channeling in the fluid bed. Air channels in the fluid bed mitigate against the chances of having a uniform concentration of fluidized powder at the desired point of contact with the revolving brushes.

Outside diameter of the fluidizing rolls can be varied within certain limits. Here again, the nature and density of the powder will influence design. Optimum speed for 4 inch brush rolls of the type described in the example, has been found to range from 360 r.p.m. to 400 r.p.m. depending on the powder density and height of fluid bed desired. Wire brush rolls will probably be preferred in most cases because of their long-wearing qualities. Tampico fibre brushes can be substituted. Even cloth covered fluidizing rolls, wherein the cloth has a long nap, can be used, although cloth will generally not be as efficient as the wire or fibre brush type roll. Splined steel or wooden rolls may also be used.

While this invention is particularly useful for the uniform application of a powder to flat metal strip and flat wire, it is not limited thereto. Paper or cloth strip may be coated with powder by the method of this invention as well.

Any commercial width of strip can be coated by the method of this invention. When narrow strip is to be coated, strip in the neighborhood of 3 to 8 inches wide, it is possible to coat both sides simultaneously by a pass through a single fluid bed. This can be accomplished by forcing the fluidized powder to a distance above the fluidizing chamber so that it will completely surround the strip when the strip is passed through this raised portion of the bed in a horizontal direction, but with the surfaces of the strip in a vertical plane. Obviously, this alternate method of coating both sides of a continuous strip is practical chiefly for the narrower widths, operational difficulties being encountered in attempting to maintain the proper concentration of powder in a bed of extreme height above the fluidizing chamber, or normal fluidizing zone.

We do not wish to be restricted to the particular combination of brush rolls given in the example, for the forcing of the fluid bed above the normal fluidizing zone. The raising of the bed can be accomplished by use of one roll in the fluidizing chamber, although with less efficiency. Other combinations of a plurality of brush rolls are comprehended by this invention, as well as means other than brush rolls for lifting the fluidized powder.

The rolls may be mounted in a position other than horizontal.

When coating the underside of metal strip with a metal powder, or other inorganic powder, it will be necessary to film the underside of the strip with a liquid bonding agent, to which the powder will adhere for such time as will be required to give the coated strip additional treatment, such as compacting or heating, to produce permanent union between powder and base strip. A liquid which serves very well for this purpose is tridecyl alcohol. This alcohol has sufficient tackiness to hold dense powder particles to the strip surface, and, in addition, has sufficient volatility so that it can be completely removed by heating at a relatively low temperature. Other substances which may be used successfully as the powder-retaining medium are kerosene, transformer oil and straw oil. Naphthene base oils having a Saybolt Standard Universal viscosity of from 90 to 110 seconds at 100° F. can also be used.

Where it is not necessary to remove bonding liquid after application of the powder, as, for example, in the manufacture of emery cloth, an adhesive liquid such as glue may be used.

Coating with powder can be performed by this invention on either metallic or non-metallic strip, and with a wide variety of powder, either organic, inorganic or metallic in nature.

By use of the term strip in the appended claims, we mean to include flat sheet as well as continuous strip or flat wire.

We claim:
1. The method of applying a uniform coating of powder on a moving strip which comprises passing a gas upwardly through a gas diffusing zone under a pressure sufficient to fluidize finely divided powder contained in a superimposed fluidizing zone, mechanically displacing fluidized powder in an upward direction by means of at least one pair of rotating rolls supplied with radial extensions with said rolls operating in opposed upward direction to raise a portion of the fluidized powder to a coating zone above said fluidizing zone, passing a continuous strip in a generally horizontal direction through the coating zone with the underside of the strip in contact with the raised portion of fluidized powder, and thereby coating the underside of said strip with powder.

2. A method according to claim 1 wherein the rolls are brush rolls.

3. A method according to claim 2 wherein the raised fluidized powder is confined within the coating zone as said continuous strip passes through said coating zone.

4. A method according to claim 3 wherein any powder in the form of fines is removed at the entrance end and exit end of said coating zone.

5. A fluid bed strip coating apparatus which comprises a first chamber for the introduction of fluidizing gas under pressure, a second chamber for containment of fluidized coating powder superimposed on said first chamber, gas diffusing means separating the two chambers, and at least one pair of adjacent, horizontally aligned, parallel rolls disposed in said second chamber, said rolls rotating in opposed upward direction and being provided with means for mechanically displacing said fluidized powder above said rolls to a coating zone directly above said second chamber and bringing said powder in contact with the underside of a moving strip traveling through said coating zone and spaced above said roll means.

6. An apparatus according to claim 5 wherein the second chamber has side walls, and end walls over which the strip travels, with the second chamber being provided with powder collecting means at the end walls.

7. An apparatus according to claim 6 wherein the side walls of the second chamber extend above the second chamber and support powder confining means in contact with the edges of a horizontally moving strip.

8. The apparatus according to claim 5 wherein the rolls are brush rolls.

9. An apparatus according to claim 8 wherein the brush rolls, rotating in opposed upward direction, are synchronously driven and operate at speeds sufficient to displace the fluidized powder to a coating zone directly above said second chamber.

References Cited

UNITED STATES PATENTS

| | | | |
|---|---|---|---|
| 2,815,550 | 12/1957 | Valyi | 117—21 |
| 2,844,489 | 7/1958 | Gemmer | 117—21X |
| 2,907,299 | 10/1959 | Weiner | 118—309 |
| 3,108,022 | 10/1963 | Church | 118—429X |
| 3,138,483 | 6/1964 | Dettling | 118—429X |
| 3,190,198 | 6/1965 | Eichorn | 118—637X |
| 3,207,618 | 9/1965 | De Hart | 117—21X |
| 3,233,584 | 2/1966 | Angstadt | 117—21 |
| 3,248,253 | 4/1966 | Barford et al. | 117—F.B. |
| 3,262,806 | 7/1966 | Gourge | 118—637X |
| 3,316,876 | 5/1967 | McCombie | 118—309X |
| 3,323,933 | 6/1967 | Barford et al. | 117—17 |
| 3,364,053 | 1/1968 | Beike | 117—21 |

FOREIGN PATENTS

| | | | |
|---|---|---|---|
| 993,566 | 5/1965 | Great Britain | 117—21 |
| 1,162,730 | 2/1964 | Germany | 117—F.B. |

WILLIAM D. MARTIN, Primary Examiner

E. J. CABIC, Assistant Examiner

U.S. Cl. X.R.

117—19, 22, 31, 33; 118—410